United States Patent Office 2,843,571
Patented July 15, 1958

2,843,571

INHIBITION OF POLYMERISATION REACTION

Arthur Middleton Eastham, Ottawa, Ontario, Canada, assignor to Polymer Corporation Limited, Sarnia, Ontario, Canada, a corporation of Canada No Drawing. Application September 8, 1953
Serial No. 379,086

7 Claims. (Cl. 260—82.1)

This invention relates to the inhibition of polymerisation reactions of butadiene or admixtures of butadiene and a copolymerisable compound. The invention is more particularly concerned with such reactions in which a peroxy compound is used as a catalyst.

Reaction inhibitors are sometimes used in small proportions to decrease the rate of reaction or conversion, but they are more generally used in larger proportions so as to terminate the reaction at any desired degree of conversion whereby further unwanted polymerisation is prevented. Such termination is commonly called "short-stopping" or "stopping" and inhibitors which effect this are hereinafter termed "stoppers." Sufficient stopper may be used so that, not only is the polymerisation terminated, but also the reaction products are stabilised against any change.

A common stopper is hydroquinone which has the advantage of being water soluble. A serious disadvantage, however, of this compound is that it causes discolouration of the polymer. 2,5-ditertiary butyl hydroquinone is known to be a more efficient stopper than hydroquinone and, in addition, does not discolour the polymer, but it has a number of serious disadvantages. It is insoluble in water and has up to now been added to the reactor in the form of a dispersion of the solid stopper in water. Remarkable difficulty has been found in forming a dispersion of 2,5-ditertiary butyl hydroquinone and the dispersions that have been formed have not been stable. This has caused difficulty in use since the dispersions tend to settle on storing and must be re-agitated before use. It is virtually impossible to obtain a uniform distribution of the 2,5-ditertiary butyl hydroquinone throughout the water. Sufficient stopper must be added so that the reaction is stopped in all parts of the reactor. The result is that there is more in some regions than is theoretically necessary. This non-uniform distribution of 2,5-ditertiary butyl hydroquinone arising from its incompatability with water and with latex has resulted in the past in erratic shortstopping behaviour.

Furthermore, and possibly most important of all, the settling of dispersions of 2,5-ditertiary butyl hydroquinone in the reactor has been found to contaminate the reactor by leaving traces of this stopper on the reactor lining after the reaction products have been withdrawn so that the reaction of the next batch was inhibited from the very beginning. Intermediate flushing of the reactor with a solvent was therefore rendered necessary between batches. This contamination is aggravated by the aforementioned need to utilise more of the stopper than is theoretically necessary.

These disadvantages of 2,5-ditertiary butyl hydroquinone over hydroquinone, in addition to its greater cost, have precluded its general commercial use in spite of its advantages in other respects.

It is the object of the present invention to suggest a commercially practicable method of using 2,5-ditertiary butyl hydroquinone as a stopper whereby the said disadvantages may be avoided.

We have discovered that the above disadvantages can be overcome by the use of an aqueous emulsion of a solution of 2,5-ditertiary butyl hydroquinone in certain solvents. The preferred solvent to effect this solution is n-octyl alcohol or diisobutyl ketone. Useful results may also be obtained with 2-ethyl hexanol. Other solvents may be used provided that the following requirements are met:

(a) It must be a good solvent for the stopper.
(b) The resulting solutions must give stable emulsions.
(c) It must be essentially water insoluble.
(d) It must not coagulate the latex.
(e) It should be reasonably high boiling to prevent overly contaminating the recovered monomers.
(f) It must not injure the properties of the finished polymer.
(g) It must be relatively cheap.

The emulsions produced according to this invention do not impair the activity of the stopper. Such emulsions are considerably more stable than the dispersions hitherto used and therefore do not present a storage problem. The emulsions are homogeneous and can therefore be distributed uniformly to all parts of the reaction mixture. Because of this property less stopper needs to be used and uniform shortstopping characteristics are obtained. There is also much less tendency to contaminate the reactor lining.

The emulsifying in water of the solutions of the stopper can be achieved in any suitable manner, e. g. by using potassium oleate as the dispersing agent.

The invention is illustrated in the following examples in which 2,5-ditertiary butyl hydroquinone is referred to by the abbreviation "DTBHQ":

*Example I*

Samples A to G were prepared with proportions as follows, the quantities indicated being either in grams or millilitres as indicated:

| | Samples | | | |
|---|---|---|---|---|
| | A | B | C | D |
| DTBHQ (g.) | 2.5 | 2.5 | 2.5 | 2.5. |
| n-Octyl alcohol (ml.) | 50 | 25 | 25 | 50. |
| 12% Pot. oleate (ml.) | 7.5 | 7.5 | 4 | |
| Daxad 11 (g.) | | | | 0.6. |
| Water (ml.) | 200 | 225 | 225 | 200. |
| Condition of emulsion after 15 hours. | Smooth | Slight creaming. | Breaking, some sediment. | Broken (about 6 hrs.). |

| | Samples | | |
|---|---|---|---|
| | E | F | G |
| DTBHQ (g.) | 2.5 | 2.5 | 2.5. |
| Diisobutyl ketone (ml.) | 25 | 15 | 25. |
| 12% Pot. oleate (ml.) | 7.5 | 5 | |
| Daxad 11 (g.) | | | 0.6. |
| Water (ml.) | 225 | 225 | 225. |
| Condition of emulsion after 15 hrs. | Creaming slowly. | Creamed, breaking. | Broken. |

The emulsions were prepared by dissolving the DTBHQ in the n-octyl alcohol or diisobutyl ketone. This solution was then added to the aqueous potassium oleate in a small colloid mill and the mixture ground at a fairly close setting for about half an hour.

Aging in the presence of air turned the emulsions from white to a yellow colour, presumably due to the oxidation of the DTBHQ in alkaline solution, but the change did not affect the stopping power. All of the emulsions tended to cream, but even when creaming was complete the emulsion could be readily reformed by mild agitation. The octyl alcohol emulsions after standing two or three weeks precipitated a brown sediment.

Example II

Bottle polymerizations were carried out with the following nitrile formula run at 36° C. to give approximately 80% conversion in 14 hours:

| | Parts |
|---|---|
| Butadiene | 66 |
| Acrylonitrile | 34 |
| Water | 250 |
| Emulsifier (composed predominantly of potassium stearate with small amounts of the potassium salts of other fatty acids) | 3.6 |
| Catalyst (potassium persulfate) | 0.1 |

Varying amounts of DTBHQ in octyl alcohol aqueous emulsion were then injected, and the bottles maintained at reaction temperature for a further fifteen hours. Conversions were determined at the time of stopping and after the second 15 hours with the results shown below:

| Parts DTBHQ/100 monomers | Conversion at Stopping, percent | After a further 15 hrs., percent |
|---|---|---|
| 0.015 | 81.5 | 82.0 |
| 0.012 | 80.8 | 86 |
| 0.009 | 82.0 | 92 |
| 0.006 | 81.6 | 96 |
| 0.003 | 83.0 | 100 |

It is apparent that 0.015 part DTBHQ per 100 parts monomers is the preferred minimum amount effectively to stop the conversion under the conditions of this experiment.

Example III

The experiments of Example II were repeated at 27.5° C. instead of 36° C. Polymerisations were run for 18 hours, stopped and conversions determined after a further five hours at reaction temperature. The results, as shown in the following table, were substantially the same as those at 36° C.

| Parts DTBHQ/100 monomers | Conversion at Stopping, percent | After a further 5 hrs., percent |
|---|---|---|
| 0.015 | 82.8 | 83.8 |
| 0.012 | 81.0 | 82.4 |
| 0.009 | 82.4 | 84.4 |
| 0.006 | 80.6 | 84.4 |

Example IV

To obtain a comparison of the stopping efficiencies of DTBHQ and hydroquinone, polymerisations were run at 27.5° C. as in Example III and stopped with an aqueous solution of hydroquinone.

| Parts HQ/100 monomers | Conversion at Stopping, percent | After a further 5 hrs., percent |
|---|---|---|
| 0.080 | 84.8 | 84.8 |
| 0.050 | 77.3 | 78.0 |
| 0.025 | 82.0 | 84.3 |
| 0.012 | 83.5 | 89.0 |
| 0.005 | 85.7 | 92.0 |

It is evident that DTBHQ is two or three times as effective as hydroquinone in preventing an increase in conversion.

Example V

The experiments of Example II were repeated with the standard GR–S formula at 50° C. with the following results:

| Parts DTBHQ/100 monomers | Conversion at Stopping, percent | After a further 6 hrs., percent |
|---|---|---|
| 0 | 89.6 | 96.6 |
| 0.030 | 89.6 | 89.6 |
| 0.021 | 85.2 | 85.4 |
| 0.018 | 87.1 | 87.3 |
| 0.015 | 84.6 | 85.0 |

It seems apparent that the effectiveness of this stopper is about the same in the GR–S formula as in the nitrile, albeit these conversions are too high for accurate assessment.

Example VI

The experiments of Example II were repeated using hydroquinone, for comparison, in the standard GR–S formula polymerised for 17.5 hours at 44° C.

| Parts HQ/100 monomers | Conversion at Stopping, percent | After a further 6 hrs., percent |
|---|---|---|
| 0 | 80.4 | 97.8 |
| 0.05 | 79.9 | 80.0 |
| 0.025 | 79.0 | 80.0 |
| 0.01 | 80.8 | 84.8 |

It is thus apparent from bottle studies that 0.015 part DTBHQ per 100 parts of monomers is about equivalent to 0.04 part of hydroquinone in either GR–S or butadiene acrylonitrile copolymerisation. Both of these quantities are the preferred minimum amounts required effectively to stop the conversion for about 12 hours.

Example VII

A five gallon charge of the nitrile formula shown in Example II was stopped with the following emulsion:

| | |
|---|---|
| Water | ml 180 |
| n-Octyl alcohol | ml 20 |
| 12% pot. oleate | ml 3 |
| DTBHQ | g 0.7 | to give a concentration of 0.015 part DTBHG/100 monomers. After stopping, the charge was held in the reactor at reaction temperature, sampled at intervals for conversion and Mooney viscosity, and finally drained and recharged.

The results are shown in the following table:

| Batch | Reaction Time, hrs. | Percent Solids at— | | | | Mooney viscosity at— | | | |
|---|---|---|---|---|---|---|---|---|---|
| | | Stopping | 2 hrs. | 4 hrs. | 8 hrs. | Stopping | 2 hrs. | 8 hrs. | 76 hrs. |
| 1 | 14½ | 23.6 | | 23.7 | 23.7 | 46 | | 51.5 | |
| 2 | 11¼ | 20.9 | 20.9 | | | | | | |
| 3 | 14 | 23.4 | 23.5 | | | 29 | 30 | | 50 |

It is seen that 0.015 part DTBHQ will hold the conversion without effecting subsequent charges, but will not prevent an increase in Mooney.

Example VIII

The experiments of Example VII were repeated using a similar emulsion with the amount of DTBHQ adjusted to give a concentration of 0.02 parts/100 monomers.

| Batch | Reaction Time, hrs. | Percent solids at— | | | Mooney viscosity at— | | | |
|---|---|---|---|---|---|---|---|---|
| | | Stopping | 6 hrs. | 8 hrs. | Stopping | 6 hrs. | 8 hrs. | 96 hrs. |
| 1 | 12.5 | 23.2 | 23.4 | 23.4 | 21.5 | 21 | 20 | |
| 2 | 12 | 23.1 | 23.4 | | 28 | 27 | | 28 |

These data show clearly that 0.02 parts DTBHQ is sufficient to prevent increase in Mooney or conversion for considerable periods, without retarding subsequent reactions. It was found, however, that 0.03 part could not be tolerated without retarding subsequent reactions.

*Example IX*

The stopper requirements during stripping were examined in an 80-gallon reactor. The batch was stopped with the following emulsion:

| | |
|---|---|
| Water _____ml__ | 2000 |
| n-Octyl alcohol _____ml__ | 400 |
| 12% pot. oleate _____ml__ | 70 |
| DTBHQ _____gms__ | 21 |

Two batches were run; "A" which was held for eight hours, then stripped for six hours at 110° F. under three inches mercury pressure; and "B" which was not held but stripped for sixteen hours at 130° F. under six inches mercury pressure. The formulation of Example VII was used.

| | Batch "A" | | Batch "B" | |
|---|---|---|---|---|
| | Percent solids | Mooney | Percent solids | Mooney |
| At Stopping | 27.93 | 75.5 | 27.5 | 52.75 |
| After holding 8 hours | 28.02 | 76 | | |
| After stripping: | | | | |
| 2 hours | | 79.3 | | 67.3 |
| 4 hours | | 77.8 | | 68.5 |
| 6 hours | | 80.5 | | 69.3 |
| 8 hours | | | | 70.0 |
| 10 hours | | | | 74.8 |
| 12 hours | | | | 72.0 |

It is apparent that 0.02 part DTBHQ is insufficient to hold the Mooney during stripping, particularly at the higher temperatures. It is also interesting to note that the critical period is in the first two hours of stripping, when the monomer concentration is highest.

*Example X*

This example shows that the increase in Mooney during stripping could be overcome by adding an additional amount, e. g. 0.015–0.02 part, of DTBHQ to the stripper in any suitable form, e. g. an aqueous slurry.

Three batches were run, bath "A" using standard GR–S and batches "B" and "C" using GR–S–10 formula. With the GR–S–10 formula, it was found necessary to increase the amount of stopper added in the reactor to 0.025 part/100 monomers, presumably due to the higher catalyst charge in this formula. The data are shown in the following table:

| | Batch "A" | Batch "B" | Batch "C" |
|---|---|---|---|
| Reaction Time _____hrs__ | 12.2 | 11.7 | 12 |
| DTBHQ in reactor, part/100 monomers | 0.02 | 0.025 | 0.025 |
| DTBHQ in Stripper, part/100 monomers | 0.02 | 0.015 | 0.015 |

| | Batch "A" | | Batch "B" | | Batch "C" | |
|---|---|---|---|---|---|---|
| | Percent Solids | Mooney | Percent Solids | Mooney | Percent Solids | Mooney |
| At stopping | 26.1 | 43.5 | 25.6 | 67.5 | 26.4 | 72 |
| After holding 8 hrs | 27.1 | 63 | 26.4 | 68 | 29.9 (?) | 71 |
| After stripping 2 hrs | | 61.5 | | 67.5 | | 66 (?) |
| After storing latex 6 days @ 70° F | | 60 | | 67.5 | | 78.5 |

Stripping was performed at 120° F.

In this specification, the term "butadiene" is intended to mean conjugated butadiene (or butadiene-1,3).

I claim:
1. In the aqueous emulsion polymerisation of compositions selected from the group consisting of butadiene and admixtures of butadiene with a copolymerisable compound the improvement which comprises substantially terminating the polymerization reaction by the addition of an emulsion prepared by emulsifying in water a solution of 2,5-ditertiary buty hydroquinone in a solvent selected from the group consisting of n-octyl alcohol and diisobutyl ketone.

2. In the aqueous emulsion polymerisation of compositions selected from the group consisting of butadiene and admixtures of butadiene with a copolymerisable compound, the improvement which comprises substantially terminating the polymerization reaction by the addition to the reaction zone of an emulsion prepared by emulsifying in water a solution of 2,5-ditertiary butyl hydroquinone in a solvent selected from the group consisting of n-octyl alcohol and diisobutyl ketone, said 2,5-ditertiary butyl hydroquinone being present in a proportion of at least 0.015 part but less than 0.03 part by weight per 100 parts of polymeric material.

3. In the aqueous emulsion polymerisation of compositions selected from the group consisting of butadiene and admixtures of butadiene with a copolymerisable compound, the improvement which comprises substantially terminating the polymerization reaction and substantially stabilizing the viscosity of the reaction products by the addition to the reaction zone of an emulsion prepared by emulsifying in water a solution of 2,5-ditertiary butyl hydroquinone in a solvent selected from the group consisting of n-octyl alcohol and diisobutyl ketone, said 2,5-ditertiary butyl hydroquinone being present in a proportion of at least 0.02 part but less than 0.03 part by weight per 100 parts of polymeric material.

4. In the aqueous emulsion polymerisation of compositions selected from the group consisting of butadiene and admixtures of butadiene with a copolymerisable compound, the improvement which comprises substantially terminating the polymerization reaction and substantially stabilizing the viscosity of the reaction products by the addition to the reaction zone of an aqueous emulsion of a solution containing at least 0.015 part but less than 0.03 part by weight of 2,5-ditertiary butyl hydroquinone in a solvent selected from the group consisting of n-octyl alcohol and diisobutyl ketone per 100 parts of polymeric material and also by the addition of a further quantity of 2,5-ditertiary butyl hydroquinone to a stripper zone which is quite distinct from the reaction zone and to which the reaction products are passed for stripping.

5. A process as claimed in claim 1 in which a peroxy compound is used as catalyst.

6. A process as claimed in claim 3 in which a peroxy compound is used as catalyst.

7. A process as claimed in claim 4 in which a peroxy compound is used as catalyst.

References Cited in the file of this patent

Dunbrook et al.: Abst. of S. N. 767,360, Mar. 13, 1951, 644 O. G. 622.

C. & E. News, Feb. 14, 1949, vol. 27, No. 7, page 461.